United States Patent [19]

Everhart

[11] Patent Number: 4,988,425
[45] Date of Patent: Jan. 29, 1991

[54] ELECTRODE WITH BOTH OUTSIDE AND INSIDE FLOW OF ELECTROLYTE FOR ELECTROCHEMICAL MACHINING

[75] Inventor: Lawrence Everhart, Utica, Mich.

[73] Assignee: Technology Tool Company, St. Clair Shores, Mich.

[21] Appl. No.: 439,910

[22] Filed: Nov. 20, 1989

[51] Int. Cl.⁵ .......................... B23H 9/14; B23H 3/04
[52] U.S. Cl. .............. 204/224 M; 204/284; 204/286; 204/297 R; 204/290 R
[58] Field of Search ................ 204/224 M, 225, 284, 204/286, 290 R, 297 R

[56] References Cited

U.S. PATENT DOCUMENTS

| | | | |
|---|---|---|---|
| 507,374 | 10/1893 | Lyte | 204/286 |
| 894,317 | 7/1908 | De Forest | 204/280 |
| 2,577,644 | 4/1943 | Bartlett | 204/224 R |
| 3,022,232 | 5/1958 | Bailey et al. | 204/224 M X |
| 3,058,895 | 10/1962 | Williams | 204/284 X |
| 3,080,310 | 11/1960 | Lindenmaier et al. | 204/286 X |
| 3,257,306 | 8/1959 | Webb | 204/224 M |
| 3,293,166 | 12/1966 | Cowing | 204/284 X |
| 3,306,838 | 12/1963 | Johnson | 204/224 M |
| 3,418,231 | 11/1965 | Haddad | 204/286 X |
| 3,436,331 | 4/1969 | Dietz et al. | 204/284 X |
| 3,468,784 | 9/1969 | Joyce et al. | 204/284 X |
| 3,476,671 | 5/1970 | Petty | 204/286 X |
| 3,753,890 | 8/1973 | Köppern et al. | 204/284 X |
| 3,801,489 | 4/1974 | Samson | 204/284 |
| 3,900,384 | 8/1975 | Gunby | 204/286 |
| 3,907,659 | 9/1975 | Paige et al. | 204/286 X |
| 3,909,388 | 9/1975 | Faust et al. | 204/224 M |
| 4,052,284 | 10/1977 | Schrader | 204/224 M |
| 4,194,960 | 3/1980 | Bleikamp, Jr. | 204/280 |
| 4,504,375 | 3/1985 | Griffioen | 204/196 |
| 4,543,460 | 9/1985 | Inoue | 219/69.17 |
| 4,626,330 | 12/1986 | Farmer | 204/197 |
| 4,743,731 | 5/1988 | Seuring et al. | 219/69.1 |
| 4,801,370 | 1/1989 | Arnesen | 204/290 R X |

Primary Examiner—Donald R. Valentine
Attorney, Agent, or Firm—Dykema Gossett

[57] ABSTRACT

An electrochemical machining apparatus is disclosed for removing material from a tubular workpiece. An electrode having a conical tip is supplied with electrolyte around the outer periphery and through the center of the electrode. A predetermined gap is maintained between the electrode and the tubular workpiece. The combination of the conical tip and the electrolyte being supplied around the outer periphery, and at the center of the electrode, ensures that the gap between the electrode and the tubular workpiece will be maintained at a predetermined distance preventing short-circuiting or uneven drilling of the tubular workpiece. A sheath of insulation surround the electrode to prevent unwanted electrochemical machining.

15 Claims, 1 Drawing Sheet

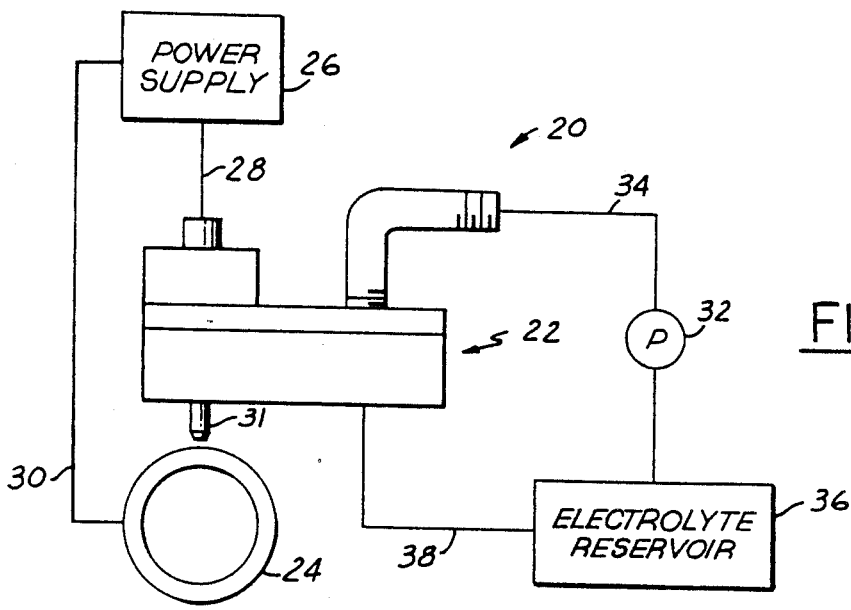
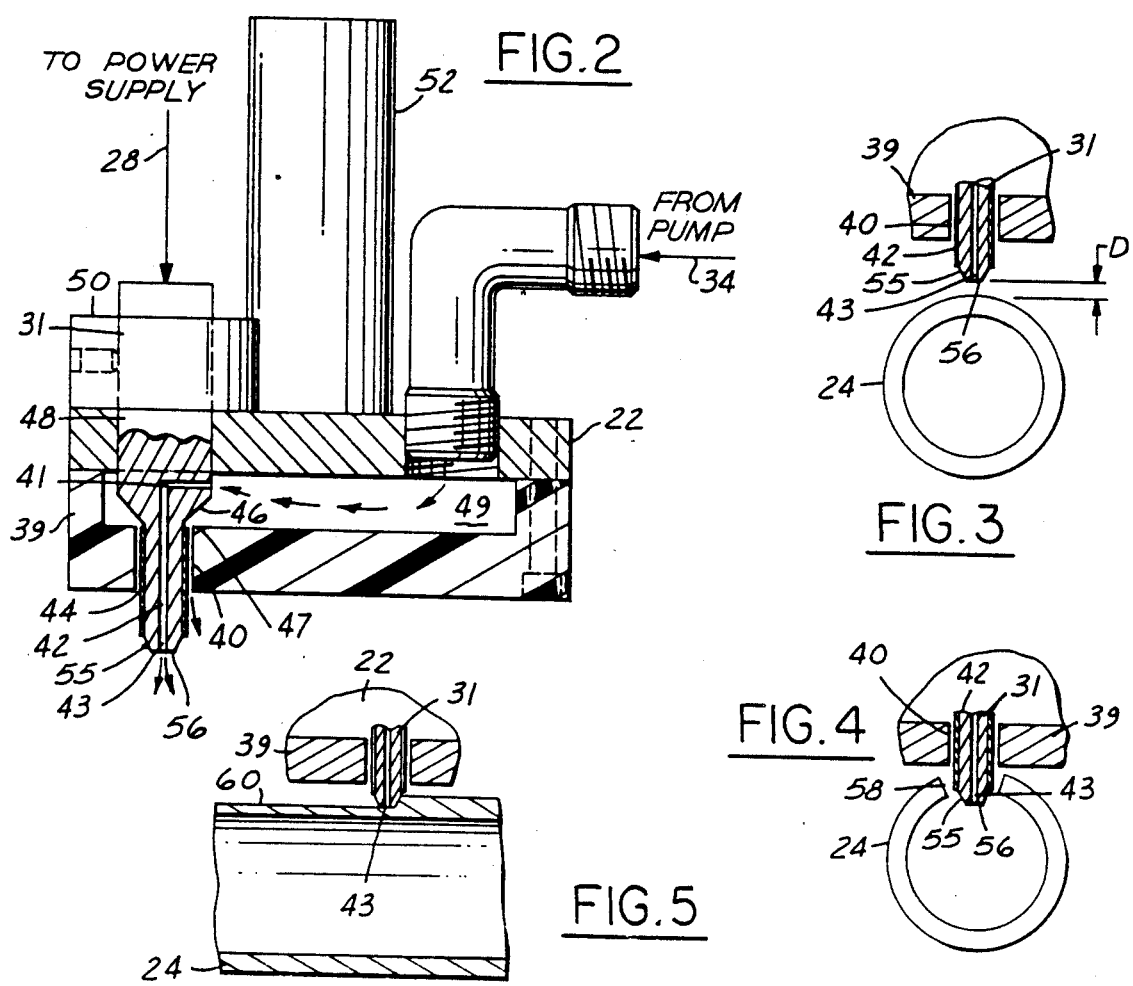

ELECTRODE WITH BOTH OUTSIDE AND INSIDE FLOW OF ELECTROLYTE FOR ELECTROCHEMICAL MACHINING

BACKGROUND OF THE INVENTION

This invention relates to an improved electrode and electrolyte flow path for electrochemical machining.

Electrochemical machining is a known process in which an electrode is placed a predetermined gap distance from a workpiece, and an electrolyte is allowed to flow into the gap between the electrode and the workpiece. Current is passed between the electrode and the workpiece, and an electrochemical process occurs which removes material from the workpiece at positions opposed to the electrode.

In electrochemical machining apparatuses, it is of the utmost importance to ensure that the predetermined gap between the electrode and the workpiece is maintained at all times. If the gap is too small, it is possible to short-circuit the electrode and stop the removal of material from the workpiece. If the gap is too large, electrochemical action will cease and no metal will be removed.

It is also important to ensure that the electrolyte is uniformly distributed about the electrode throughout the area of the workpiece upon which the electrochemical machining is to be performed. If the concentration of electrolyte is not uniform cross the entire area to be machined, it is possible that the areas of greater electrolyte concentration will be more rapidly removed, and thus there may be uneven removal from the workpiece. This in turn can quickly cause the gap between the electrode and the workpiece to vary from the predetermined gap and may short-circuit the apparatus.

The problems with maintaining the gap between the electrode and the workpiece become particularly apparent when the workpiece is a curved or tubular member. Since the outer periphery of the workpiece will be extending along a curved radius in such a member, it is difficult to accurately position an electrode with respect to the workpiece. In the prior art, a hollow cylindrical electrode was utilized, and the electrolyte was passed through the center of the electrode. Such an electrode proved undesirable since the electrode in this arrangement would extend over too great a surface area, and due to the curvature of the workpiece, it was difficult to accurately maintain a desired gap between the electrode and the curved or tubular workpiece. If a cylindrical electrode is tilted there would not be an even gap between the electrode and the workpiece. This is true even for a flat surface workpiece.

In several electrochemical machining applications, the conventional method of supplying electrolyte to the gap between the electrode and the workpiece is inadequate. Electrochemical machining at an oblique angle into a flat surface or at any angle into a curved surface are examples of these applications. The electrolyte flows to the place of least resistance, normally the largest gap, and not through the tightest gap, thus resulting in an area of inadequate electrolyte allowing the electrode to contact the workpiece which may damage the workpiece or the electrode. These applications are not adequately performed with standard electrochemical machining methods since the electrolyte cannot be controlled, or at best additional external restraints are required to ensure that the electrolyte is properly supplied to the gap between an electrode and a workpiece.

Also, problems are encountered with standard electrochemical machining methods at the moment of breakthrough of a drilled hole or the like. Since a drilled hole tends to break through at a center point first, the electrolyte may often escape through the breakthrough hole before the entire drilled hole is machined to its full dimension. When this happens, there is a possibility of the electrode again contacting the workpiece, increasing the likelihood of a short circuit.

It is known in electro-discharge machining to supply a dielectric machining fluid to the outer periphery of a cylindrical electrode as a coolant and to remove waste materials from the gap between the electrode and the workpiece. However, electrochemical machining is a much different process than electro-discharge machining and uses a different fluid.

It is therefore an object of the present invention to disclose an electrode holder and electrode shape to be utilized for electrochemical machining of tubular workpieces in which the electrode has a conical point, and an electrolyte is supplied in adequate amounts at the outer periphery and at the center of the electrode to ensure even removal of material from the workpiece. The electrolyte is supplied in adequate amounts even when the electrochemical machining is performed on workpieces of such shapes, or at such angles, as to make proper electrolyte flow difficult by conventional methods.

SUMMARY OF THE INVENTION

The present invention discloses an electrochemical machining apparatus for machining workpieces in which an electrode holder is positioned above a workpiece, and an electrical current is passed between the two. An electrolyte is supplied to the electrode holder from an electrolyte reservoir by a pump. The electrolyte passes into a manifold within the electrode holder and out through a gap between the outer periphery of the electrode and the electrode holder, and through the center of the electrode. Without flow at the outer periphery, the distribution is too thin near the outer periphery; without flow at the center, the distribution is too thin at the center. The speed of machining is much better with a confined, relatively high-pressure flow through the center which also ensures adequate electrolyte flow when walls of the workpiece might restrict outside flow. The combination of supplying electrolyte to these two areas ensures adequate, uniform distribution of electrolyte to the entire work area.

By moving the electrode vertically within the electrode holder, the electrode may be positioned to adjust the gap between the electrode and a workpiece. This is particularly important in applications where multiple operations of a similar nature are occurring such as a plurality of holes being drilled by a single electrode holder that may mount a plurality of electrodes. By allowing adjustment of the electrode within the electrode holder, the same gap can be set for the plural electrodes so that the same results can expected from the plurality of electrodes.

The electrode and the electrode holder may be moved together by a separate tool, or any movement means, such that the electrode may be brought downwardly to drill a hole through the outer periphery of the tubular member. By moving the tubular member relative to the electrode, a cut or score line may be formed in the outer periphery of the workpiece.

A flared stop portion of the electrode abuts a stop portion within the electrode holder to define a vertically lowermost position of the electrode with respect to the electrode holder. An insulation sheath prevents electrochemical machining by the cylindrical upper portion of the electrode ensuring round drilled holes.

The flow of electrolyte to the outer periphery of the electrode travels along the cylindrical upper portion, or passage section, of the electrode and then adheres to the perimeter of the conical tip of the electrode as it moves downwardly into the gap between the electrode and the workpiece. This adherence of the electrolyte to the conical tip keeps the electrode from contacting the workpiece in applications where prior art electrodes may have contacted the workpiece.

In drilling a hole with the electrode of the present invention, the flow through the tip is initially the most important as the electrode approaches the workpiece.

As the electrode begins to cut through the workpiece, there is a danger of the electrolyte not being adequately supplied to a gap formed between the conical walls of the conical tip of the electrode and the walls of the hole that is being drilled. During this portion of the drilling of the hole, the supply of fluid to the outer periphery of the electrode becomes the most important since it ensures adequate supply of fluid to the gap between the conical walls of the conical tip of the electrode and the conical walls of the hole that is being drilled.

As the electrode continues to drill into the hole, it reaches a point where the flow of fluid around the outer periphery of the electrode begins to stagnate in the hole as it is being drilled. At this time, the flow of fluid through the center, which tends to be at a higher pressure, causes any electrolyte that may be stagnating within the drilled hole to circulate and ensures adequate distribution of electrolyte to the entire gap.

Lastly, as the tip of the electrode begins to break through the wall of the workpiece, the flow of fluid from the center will exit through the breakthrough hole. At this point, the flow of fluid around the outer periphery of the electrode again becomes the most important flow, providing adequate electrolyte in the gap to ensure a true, round drilled hole of the proper diameter.

These and other objects and features of the present invention can be best understood from the following specification and drawings, of which the following is a brief description thereof.

BRIEF DESCRIPTION OF THE DRAWINGS

FIG. 1 is a largely schematic view, of the improved electrochemical machining apparatus of the present invention.

FIG. 2 is an enlarged cross-sectional view through an electrode holder as utilized in the improved electrochemical machining apparatus of the present invention.

FIG. 3 is an enlarged cross-sectional view of an electrode and a tubular workpiece in accordance with the present invention.

FIG. 4 is a view similar to FIG. 3, but showing the progression of an electrode into the tubular workpiece.

FIG. 5 is a view similar to FIG. 3, but showing the relative movement of the tubular workpiece and the electrode to form a score line at the outer periphery of the tubular workpiece.

DETAILED DESCRIPTION OF A PREFERRED EMBODIMENT

Electrochemical machining apparatus 20 is illustrated in FIG. 1 and contains electrode holder 22 positioned above a tubular workpiece 24 that is to be scored, cut or drilled. It is to be understood that the workpiece could be a shape other than tubular. Power supply 26 is connected at 28 to electrode 31, and at 30 to workpiece 24 and passes a direct electrical current between the two. Pump 32 supplies an electrolyte through line 34 from electrolyte reservoir 36 to electrode holder 22. Optional return line 38 may return unused electrolyte from electrode holder 22 back to electrolyte reservoir 36.

FIG. 2 is a cross-sectional view of electrode holder 22 of the present invention. Electrode 31 is mounted within holder body 39 which has an opening 40 through which a passage section 42 of electrode 31 extends. A sheath of insulation material 44, that may be epoxy resin or the like, is placed on the outer periphery of the passage section 42 and extends downwardly to the beginning of a conical tip 56, which is not coated. Sides 55 extend inwardly to form conical tip 56. The sheath 44 may be shrink-wrapped and prevents electrochemical machining between passage section 42 and workpiece 24.

Passage section 42 extends radially outwardly at flared stop 46, which corresponds to stop 47 within holder body 39, and defines a vertically lowermost position for electrode 31. Enlarged portion 48 of electrode 31 extends outwardly of holder body 39 and is connected to power supply 28. Electrode 31 may be moved upwardly or downwardly by any known method to position electrode 31 with respect to tubular workpiece 24.

Electrolyte supply line 34 is connected into holder body 39 and supplies an electrolyte to electrolyte manifold 49. Electrolyte can flow from manifold 49 into a gap between passage section 42 of electrode 31 and opening 40. Opening 40 is of a slightly larger diameter than passage section 42, and thus the electrolyte can flow freely between the two. Electrolyte also enters central bore 41 of electrode 31 and flows out at opening 43. The combination of the two flow paths ensures adequate, even distribution of electrolyte to the entire work area.

Adjustable mount 50, that may be of a known type, mounts electrode 31 at predetermined vertical positions. Electrode 31 may be moved through adjustable mount 50 with respect to holder body 39 to adjust the position of electrode 31 with respect to tubular workpiece 24. This is particularly important when plural electrodes are utilized. Electrode holder mount 52, FIG. 2, extends from the top surface 53 of electrode holder 22 and can be mounted to a tool base or the like.

Electrode 31 has a conical tip 56 that results in point gap between electrode 31 and tubular workpiece 24. The electrolyte from manifold 49 passes through opening 40 and opening 43 and is supplied to a work area between electrode 31 and tubular workpiece 24 to ensure uniform distribution of electrolyte. The electrolyte causes a chemical reaction due to the supplied current and removes material from the workpiece.

As shown in FIG. 3, passage section 42 of electrode 31 extends through opening 40 of holder body 39 and is moved towards and away from tubular workpiece 24 to define gap D. A desired gap D is determined by consideration of several variables, including the type of electrolyte utilized, the speed of machining that is desired, the material to be machined, the amount of current supplied to the electrode and tubular workpiece, and several other variables. A typical gap may be on the order of 15/1000 of an inch and thus is difficult to accurately maintain. It is important that gap D is maintained at the predetermined value. Since electrode 31 has a roughly conical tip 56, it is relatively simple to ensure that it is properly oriented to the curved surface of tubular workpiece 24.

In the prior art electrochemical apparatus for machining a cylindrical or tubular workpiece, it was necessary to ensure that the electrode was not tilted with respect to the workpiece; otherwise, the gap D would vary along the surface of the electrode. By utilizing a conical tip and roughly creating a point gap between the electrode 31 and the tubular workpiece, the maintenance of a desired gap D is much easier to realize. In addition, supplying electrolyte about both the outer periphery and the center of electrode 31 ensures uniform distribution of the electrolyte liquid between electrode 31 and tubular workpiece 24.

The movement of electrode 31 vertically downwardly by some means to drill hole 58 into tubular workpiece 24 is illustrated in FIG. 4. Gap D is maintained between the electrode and the actual surface of tubular workpiece 24. However, as the electrochemical process removes material from the outer periphery of tubular workpiece 24, the electrode is brought vertically downwardly into the area where the material was removed from, gap D is accurately maintained. Thus, electrode 31 is continuously brought downwardly into tubular workpiece 24, and hole 58 is drilled through tubular workpiece 24. As hole 58 is beginning to be formed within tubular workpiece 24, a gap is also formed between the sides 55 of conical tip 56 of electrode 31 and the beginnings of hole 58. The supply of the electrolyte to the outer periphery of electrode 31 ensures that there will be an adequate supply of electrolyte through the gap between the sides 55 of conical tip 56 of electrode 31 and tubular workpiece 24. The supply of electrolyte through the center of conical tip 56 ensures an adequate supply opposite conical tip 56.

As the electrode 31 begins to drill through workpiece 24, flow through opening 43 is initially the most important. The flow through opening 43 will tend to be at a higher pressure than the flow around the outer periphery through opening 40 due to being confined in passage 43. This flow is directed into the gap D between the electrode 31 and workpiece 24 before hole 58 begins to be drilled.

As soon as the area of the workpiece being machined is sufficiently large that the differences in the size of the gap between the workpiece and the electrode would allow electrolyte delivered from the center passage of the tube to escape unevenly, the electrolyte flow delivered on the outside of the tip becomes of paramount importance. During this period, the flow of fluid around the outer periphery of electrode 31 becomes most important since it ensures adequate supply of fluid between the conical sides 55 of conical tip 56 and the walls of the hole 58. Electrolyte from opening 40 travels along the length of the passage section 42 of electrolyte 31 and then adheres to conical sides 55 of conical tip 56, thus being directed into the gap between electrode 31 and hole 58.

As electrode 31 continues to drill into tubular workpiece 24, the flow of fluid along the outer periphery of electrode 31 may tend to stagnate within hole 58. At this point, the flow of fluid through opening 43, which is at a higher pressure than the flow through opening 40, again becomes the most important and ensures circulation of electrolyte within hole 58.

Lastly, as illustrated in FIG. 4, conical tip 56 initially breaks through hole 58 at a small center portion of the hole 58. When this happens, the electrolyte supplied through central opening 43 may no longer be directed into the gap between conical sides 55 and hole 58 but may exit through this hole. At this point, the flow around the outer periphery becomes most important and ensures that electrochemical machining will continue between sides 55 and the sides of hole 58, ensuring that the final drilled hole 58 will have cylindrical round sides.

FIG. 5 shows the scoring of the outer periphery of tubular workpiece 24 for sawing, milling, cutting, contouring, or forming a score line for some purpose. Some means of moving one of electrode holder 22 or tubular workpiece 24 with respect to the other is required. Electrode 31 is positioned such that gap D is maintained, and the electrochemical process is begun. Tubular workpiece 24 is moved with respect to electrode holder 22 by moving either electrode holder 22 or tubular workpiece 24 by any well-known means of three-dimensional movement. Tubular workpiece 24 is shown having been moved longitudinally along electrode 31 and electrode holder 22, and score line 60 has been formed along its outer periphery.

Electrode 31, as an example, may be formed from tool steel or other electrically conductive material suitable to the electrolyte environment.

Conical tip 56 has a flat end due to opening 43. However, if the conical tip did extend to a point, the conical sides would converge to that point at an angle between 45° and 90°. In one embodiment this angle is 90°.

The electrolyte may be any electrolyte commonly used for electrochemical machining.

A preferred embodiment of the present invention has been disclosed; however, it should be understood that a worker skilled in the art would find certain modifications of this invention obvious, and thus the following claims should be reviewed in order to determine the true scope and content of the invention.

What is claimed is:

1. An apparatus for electrochemical machining, comprising:
   a power supply;
   an electrode holder containing an electrode having a central fluid passage;
   said power supply being connected to said electrode and a workpiece and passing a current therebetween;
   an electrolyte reservoir containing an electrochemical machining electrolyte;
   means for directing the electrochemical machining electrolyte from said electrolyte reservoir to said electrode holder;
   a manifold in said electrode holder such that the electrochemical machining electrolyte is directed from said manifold to a gap located between said electrode and a workpiece through both said central fluid passage and around the outer periphery of said electrode to ensure adequate supply and uniform distribution of the electrochemical machining electrolyte; and said electrode has a passage section of a first diameter and an enlarged section of a second diameter larger than said first diameter, said enlarged section being mounted within said electrode holder, said electrode holder having an opening for passage of said passage section and defining a stop, said opening being of a third diameter smaller than said second diameter such that said opening prevents passage of said enlarged section outwardly of said opening.

2. An apparatus as recited in claim 1, and wherein said electrode has a conical tip, said gap being defined between the point of said tip and said workpiece, said central fluid passage supplying said electrochemical machining electrolyte to said conical tip.

3. An apparatus as defined in claim 2, and wherein said third diameter is equal to a desired diameter of a final hole to be drilled in said workpiece.

4. An apparatus as recited in claim 2, and wherein said first diameter is less than said third diameter, thus defining a clearance for passage of said electrochemical machining electrolyte between said electrode and said electrode holder.

5. An apparatus as recited in claim 4, and wherein said passage section has a sheath of insulation material placed at an outer periphery, said conical tip of said electrode being uninsulated.

6. An apparatus as recited in claim 5, and wherein said electrode is vertically movable with respect to said electrode holder.

7. An apparatus as recited in claim 1, and wherein said workpiece is tubular.

8. An apparatus as recited in claim 7, and wherein a sheath of insulation is disposed about said electrode.

9. An apparatus as recited in claim 8, and wherein said electrode is formed of tool steel.

10. An apparatus as recited in claim 9, and wherein said sheath of insulation is formed from epoxy resin.

11. An apparatus for electrochemical machining, comprising:

an electrode holder containing an electrode having a central fluid passage;

a electrolyte reservoir containing electrochemical machining electrolyte;

a pump for supplying the electrochemical machining electrolyte from said electrolyte reservoir to said electrode holder; and a manifold in said electrode holder whereby said electrochemical machining electrolyte is directed both through said central fluid passage and around the outer periphery of the electrode to ensure adequate supply and uniform distribution of the electrochemical machining electrolyte about said electrode; and said electrode has a passage section of a first diameter and an enlarged section of a second diameter larger than said first diameter, said enlarged section being mounted within said electrode holder, said electrode holder having an opening for passage of said passage section and defining a stop, said opening being of a third diameter smaller than said second diameter such that said opening prevents passage of said enlarged section beyond said opening.

12. An apparatus as recited in claim 11, and wherein said electrode has a conical tip.

13. An apparatus as recited in claim 12, and wherein said central fluid passage includes a first portion extending to the outer periphery of said enlarged section and a second portion extending to open at said conical tip.

14. An apparatus as recited in claim 13, and wherein said first diameter is less than said third diameter, thus defining a clearance for passage of said electrochemical machining electrolyte between said electrode and said electrode holder.

15. An apparatus as recited in claim 14, and wherein said passage section has a sheath of insulation material placed at an outer periphery, said conical tip of said electrode being uninsulated.

* * * * *